US012458901B2

(12) United States Patent
Kamiyama

(10) Patent No.: US 12,458,901 B2
(45) Date of Patent: Nov. 4, 2025

(54) TRANSFORMABLE TOY FOR FIGURE PLAY

(71) Applicant: EPOCH COMPANY, LTD., Tokyo (JP)

(72) Inventor: Kei Kamiyama, Tokyo (JP)

(73) Assignee: EPOCH COMPANY, LTD., Tokyo (JP)

( * ) Notice: Subject to any disclaimer, the term of this patent is extended or adjusted under 35 U.S.C. 154(b) by 217 days.

(21) Appl. No.: 18/386,038

(22) Filed: Nov. 1, 2023

(65) Prior Publication Data

US 2024/0149182 A1 May 9, 2024

(30) Foreign Application Priority Data

Nov. 4, 2022 (JP) ................................. 2022-177262

(51) Int. Cl.

| | |
|---|---|
| ***A63H 33/30*** | (2006.01) |
| ***A47B 1/04*** | (2006.01) |
| ***A63H 3/52*** | (2022.01) |
| ***A63H 17/00*** | (2006.01) |
| ***A63H 17/26*** | (2006.01) |
| ***A63H 33/00*** | (2006.01) |
| ***B62D 63/06*** | (2006.01) |
| ***B62K 27/00*** | (2006.01) |

(52) U.S. Cl.
CPC ............. *A63H 33/003* (2013.01); *A47B 1/04* (2013.01); *A63H 3/52* (2013.01); *A63H 17/264* (2013.01); *B62K 27/003* (2013.01)

(58) Field of Classification Search
CPC .......... A47B 1/04; A63H 17/00; A63H 17/26; A63H 33/00; A63H 33/003; A63H 33/30; B62K 27/003
See application file for complete search history.

(56) References Cited

U.S. PATENT DOCUMENTS 595,192 A * 12/1897 McAdams ............... A47B 1/03 108/67
1,244,208 A * 10/1917 Heymann ................ A47B 1/06 108/68
1,463,701 A * 7/1923 Holton ................... A47B 35/00 108/65
1,577,600 A * 3/1926 Volpi ....................... A47B 1/06 108/68
2,110,068 A * 3/1938 Kowalski ............... A47B 1/056 312/282
2,634,183 A * 4/1953 Derman ................... A47B 1/02 108/166

(Continued)

FOREIGN PATENT DOCUMENTS

JP S63-074198 U 5/1988

*Primary Examiner* — John A Ricci
(74) *Attorney, Agent, or Firm* — Faegre Drinker Biddle & Reath LLP

(57) ABSTRACT

A transformable toy for figure play includes a first member and a second member. The first member includes a main body member and an opening and closing member connected to the main body member through a hinge portion. The second member includes a plurality of regulation members configured to be disposed on an outer peripheral surface of the first member. The second member is provided to be attachable to and detachable from the first member in a rotating shaft direction of the hinge portion.

5 Claims, 10 Drawing Sheets

(56) References Cited

U.S. PATENT DOCUMENTS

| | | | | | |
|---|---|---|---|---|---|
| 4,223,945 | A * | 9/1980 | Nikitits | A47B 3/14 | 108/166 |
| 5,687,980 | A * | 11/1997 | Eckroth | B62K 27/16 | 280/42 |
| 6,347,591 | B1 * | 2/2002 | Karpa | A47B 37/00 | 108/50.11 |
| 11,396,255 | B2 * | 7/2022 | Wroge | B60P 3/39 | |
| 11,639,128 | B2 * | 5/2023 | DeCristo | B60P 3/0257 | 296/22 |
| 2020/0189684 | A1 * | 6/2020 | Engel | B62K 27/003 | |

* cited by examiner

TRANSFORMABLE TOY FOR FIGURE PLAY

CROSS-REFERENCE TO RELATED APPLICATIONS

This application is based on and claims priority under 35 USC 119 from Japanese Patent Application No. 2022-177262 filed on Nov. 4, 2022, the contents of which are incorporated herein by reference.

TECHNICAL FIELD

The present disclosure relates to a transformable toy used for figure play.

BACKGROUND ART

In the related art, a transformable toy used for figure play has been disclosed. JPS63-074198U discloses a transformable toy where a first form is a drawer and a second form is a store. The transformable toy can be transformed from the first form into the second form, for example, by deploying a side plate and bringing down an extension plate inside a hinged door forward to expose a structure provided in the drawer.

SUMMARY OF INVENTION

A play where the toy is transformed by exposing the structure hidden in the drawer or the like to the outside is interesting in that the structure that is invisible in the non-transformed state appears. On the other hand, when the structure hidden in the drawer is known, a user loses interest in transforming and playing the toy. Accordingly, a transformable toy where a play of transformation can also be enjoyed while recognizing a structure before and after transformation is desired.

The present disclosure provides a transformable toy for figure play where a play of transformation can also be enjoyed while recognizing a structure before and after transformation.

The present disclosure provides a transformable toy for figure play including: a first member including a main body member and an opening and closing member connected to the main body member through a hinge portion; and a second member including a plurality of regulation members configured to be disposed on an outer peripheral surface of the first member, the second member being provided to be attachable to and detachable from the first member in a rotating shaft direction of the hinge portion.

According to the above-described aspect, a transformable toy for figure play where a play of transformation can also be enjoyed while recognizing a structure before and after transformation can be provided.

BRIEF DESCRIPTION OF DRAWINGS

The present disclosure will be described in detail based on the following without being limited thereto, wherein.

DESCRIPTION OF EMBODIMENTS

Figure 1:
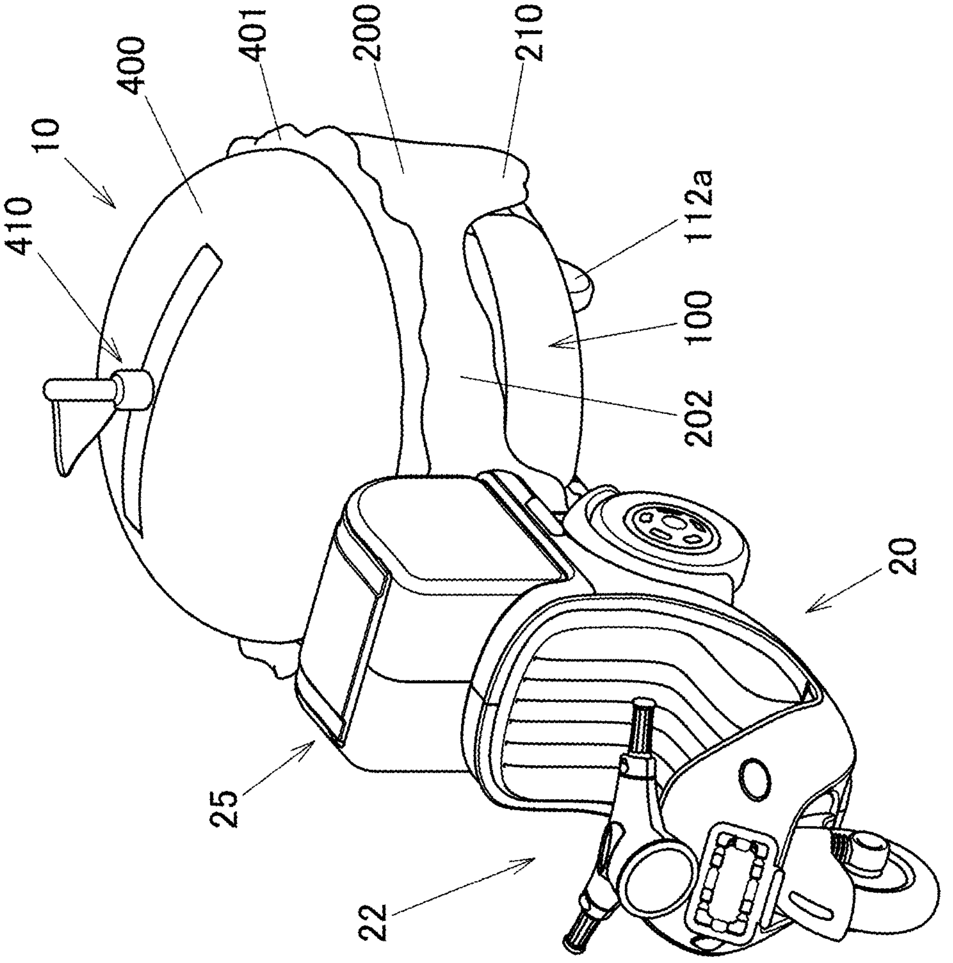
FIG. 1 is a perspective view illustrating a transformable store toy and a three-wheel bike toy as a transformable toy for figure play according to an embodiment of the present disclosure when seen from the top.
Figure 2:
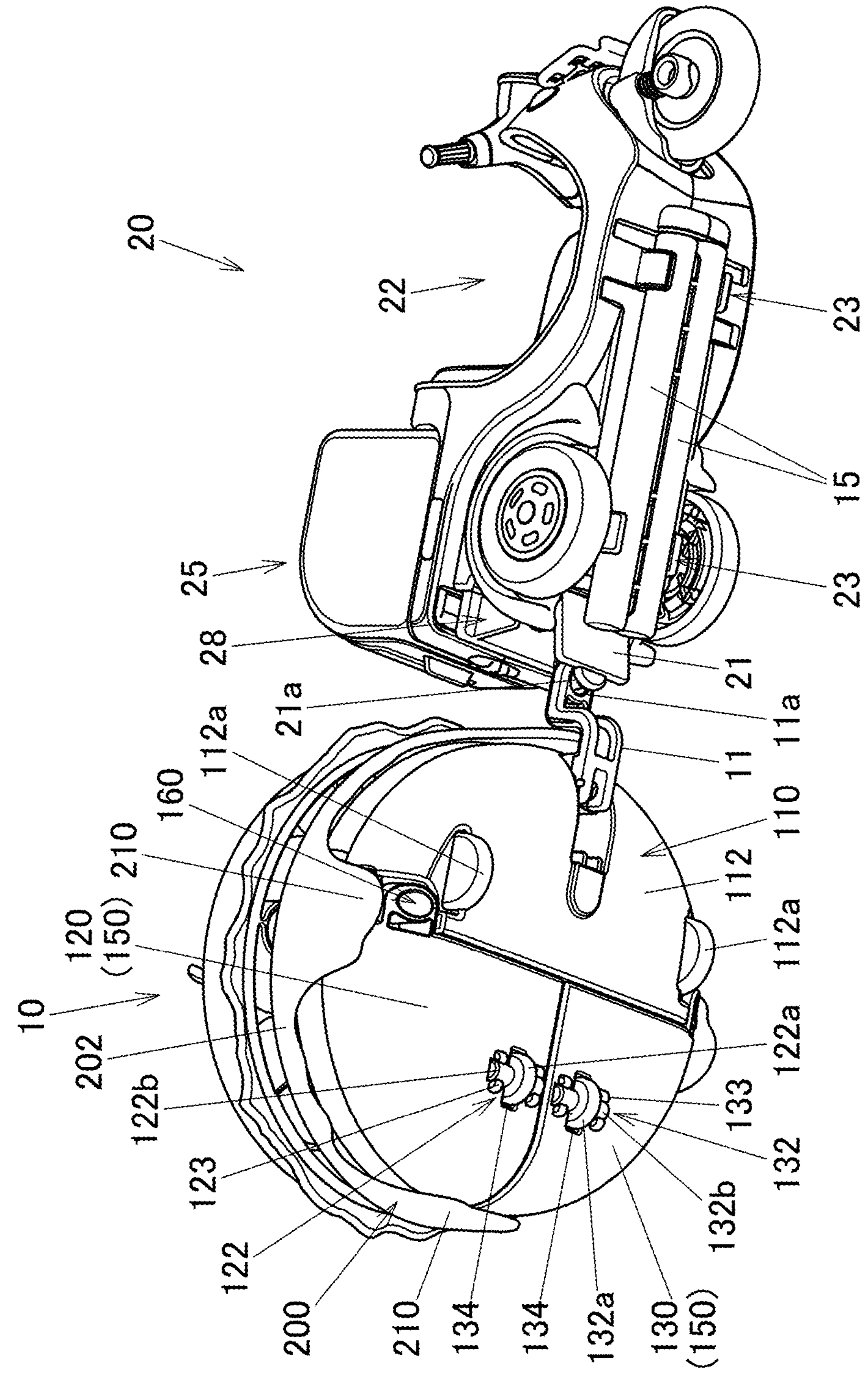
FIG. 2 is a perspective view illustrating the transformable store toy and the three-wheel bike toy as the transformable toy for figure play according to the embodiment of the present disclosure when seen from the bottom.

Next, an embodiment of the present disclosure will be described based on the drawings. As illustrated in FIGS. 1 and 2, a transformable store toy 10 as a transformable toy for figure play is formed as a towed vehicle toy imitating a burger. The transformable store toy 10 can be played while being connected to a three-wheel bike toy 20 as a towing vehicle toy. As illustrated in FIG. 2, the transformable store toy 10 and the three-wheel bike toy 20 are connected when a pin 21*a* of a connection tool 21 that is provided to be tiltable to a rear end of the three-wheel bike toy 20 through a hinge is inserted into a connected hole 11*a* of a connected tool 11 that is provided to be projectable from and retractable into a bottom surface of the transformable store toy 10 by rotating through a hinge.

In the following description, it is assumed that a front side of the three-wheel bike toy 20 (the connected tool 11 side in the transformable store toy 10) is a front side, a side opposite to the front side is a rear side, an upper side of the three-wheel bike toy 20 is an upper side, and a lower side of the three-wheel bike toy 20 is a lower side. In the following description, it is assumed that a left side when seen from the front side is a left side and a right side when seen from the front side is a right side. A figure used for figure play can be placed on a seat portion 22 of the three-wheel bike toy 20 such that the three-wheel bike toy 20 can be played as if the figure drives the three-wheel bike toy 20. In a rear box 25 of the three-wheel bike toy 20, a burger toy, a fried potato toy, and a juice toy (not illustrated) for burger shop play can be stored.

Figure 3:
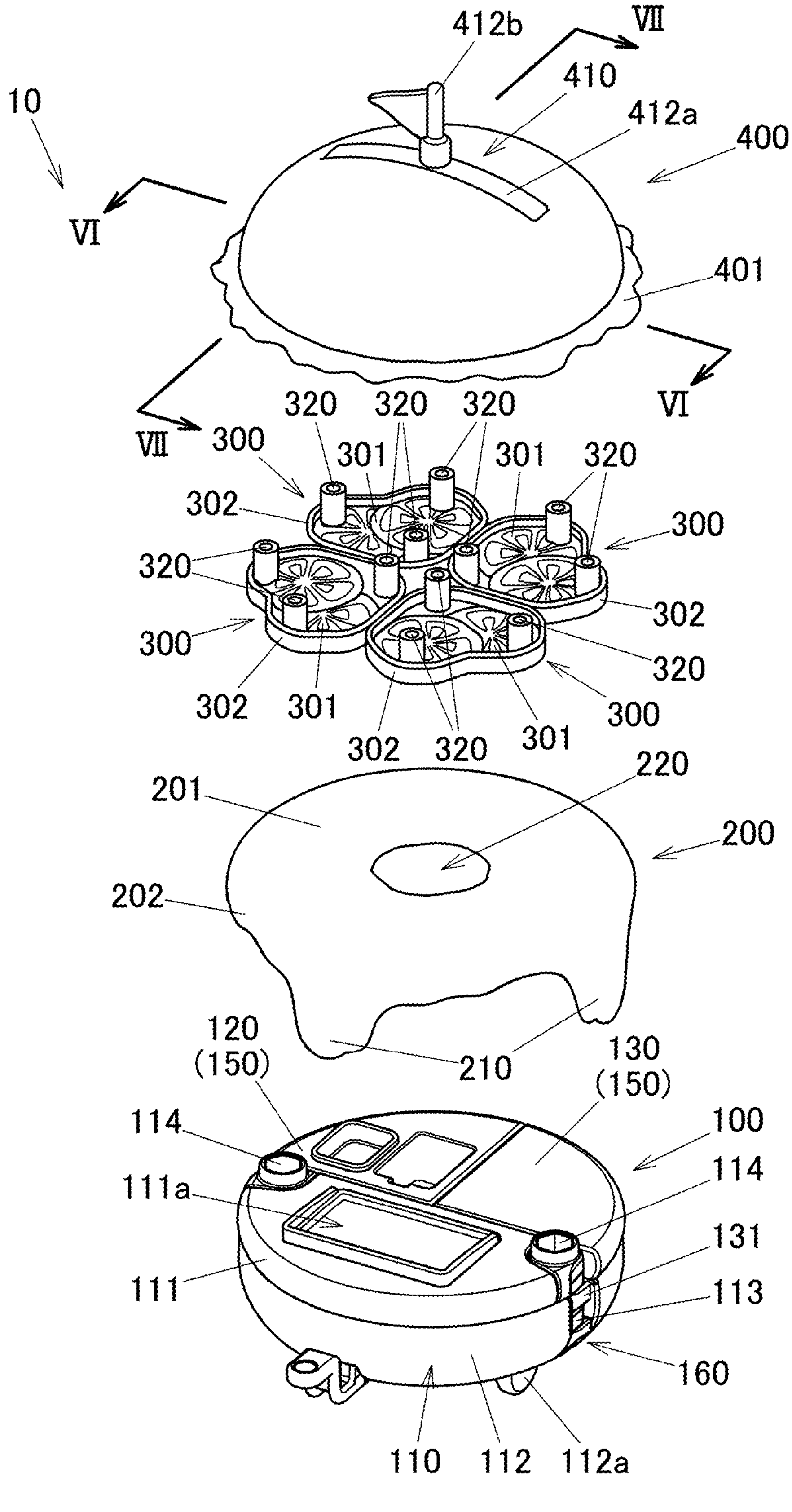
FIG. 3 is an exploded perspective view illustrating the transformable store toy as the transformable toy for figure play according to the embodiment of the present disclosure.

As illustrated in FIG. 3, the transformable store toy 10 includes a first member 100, a second member 200, a plurality of third members 300, and a fourth member 400. The transformable store toy 10 is a towed vehicle toy in a form illustrated in FIGS. 1 and 2 assembled by the first member 100, the second member 200, the third members 300, and the fourth member 400 being stacked in order from below.

As illustrated in FIG. 3, the first member 100 is a structure in a form imitating a bun on a lower side of the burger and a patty placed on the bun. The first member 100 is formed in a substantially flat hemispherical shape with a substantially flat upper surface. In the first member 100, the front half side is a main body member 110. In the first member 100, the rear half side is further divided into right and left sides, the left side is a left opening and closing member 120 as an opening and closing member 150, and the right side is a right opening and closing member 130 as the opening and closing member 150.

In the main body member 110 of the first member 100, the upper side is an upper main body member 111 that is a substantially plate-like lid member, and the lower side is a lower main body member 112 including a recessed storage portion (not illustrated). In the storage portion of the lower main body member 112, a cooking utensil toy (toy (not illustrated) imitating a fryer or a tray) that is used in the form imitating the burger shop (refer to FIGS. 8 and 9) can be stored.

In the upper main body member 111, a tray portion 111*a* is provided on an upper surface. An edge portion of the tray portion 111*a* protrudes in a substantially U-shaped wall shape with an opening on the rear side. On an upper surface of the main body member 110 in the vicinity of the hinge portion 160 on each of the right and left sides described below (that is, an upper surface of each of right and left corners of the main body member 110), a substantially hexagonal store post hole 114 is provided. An outer periphery of the store post hole 114 protrudes from the upper surface of the upper main body member 111. The edge portion of the tray portion 111*a* and the outer periphery of the store post hole 114 have the same height of protrusion from the upper surface of the upper main body member 111.

As illustrated in FIG. 2, on a lower surface of the lower main body member 112, the above-described connected tool 11 is provided in a front end edge portion of the lower main body member 112. The connected tool 11 is formed in a substantially crank shape, in which a protrusion (not illustrated) protrudes in a base end portion such that the horizontal direction is a shaft center, and is connected to a recess portion (not illustrated) provided in a housing of the lower main body member 112 to form a hinge. In a tip portion of the connected tool 11, the connected hole 11*a* as a through hole is provided. The connected tool 11 is projectable and retractable by rotating to protrude to the front side of the lower main body member 112 and by disposing the connected hole 11*a* on the lower surface side of the lower main body member 112 (refer to FIGS. 8 and 9). On the lower surface of the lower main body member 112, two substantially hemispherical installation portions 112*a* are provided to be disposed on the right and left sides at a predetermined interval such that a plate surface faces the horizontal direction.

Figure 9:
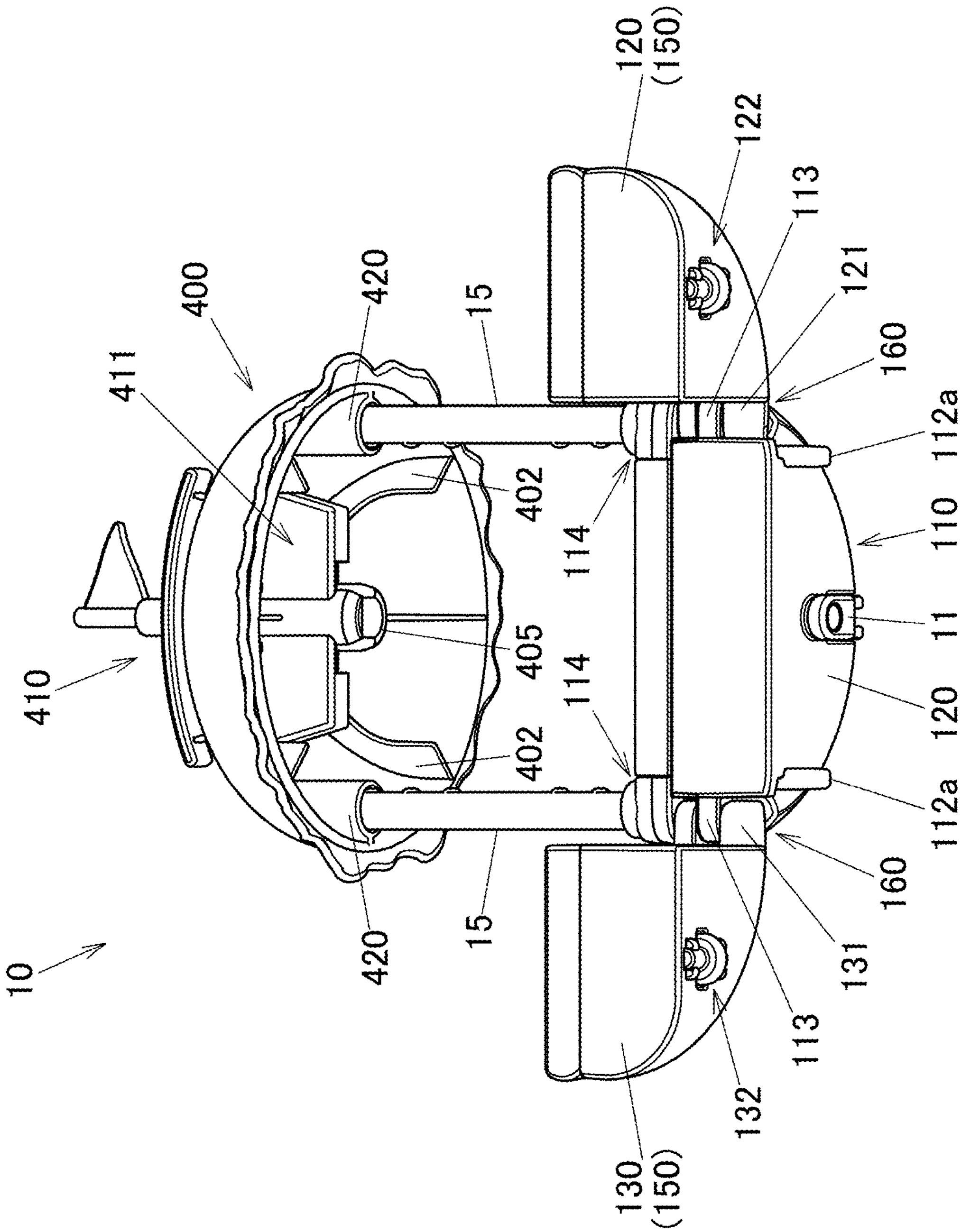
FIG. 9 is a perspective view illustrating the state where the transformable store toy as the transformable toy for figure play according to the embodiment of the present disclosure is transformed and played as a store when seen from the rear.

As illustrated in FIG. 9, the opening and closing member 150 (the left opening and closing member 120 and the right opening and closing member 130) is connected to the main body member 110 through the hinge portion 160 at the corners of the main body member 110 and the opening and closing member 150. The hinge portion 160 includes: bifurcated hinge portions 121 and 131 that protrude in a bifurcated shape from the left opening and closing member 120 and the right opening and closing member 130, respectively; and two hinge support portions 113 that protrude from the main body member 110 and are disposed between the bifurcated hinge portions 121 and 131. The hinge portion 160 is provided such that a rotating shaft direction is the vertical direction when protrusions (not illustrated) that protrude upward and downward from the hinge support portions 113 are inserted into shaft hole portions (not illustrated) provided in the bifurcated hinge portions 121 and 131.

As illustrated in FIG. 2, a left wheel 122 and a right wheel 132 are provided on lower surfaces of the left opening and closing member 120 and the right opening and closing member 130, respectively. In the left wheel 122 and the right wheel 132, disk-like wheel portions 122*a* and 132*a* and two axle portions 122*b* and 132*b* that protrude from both side surfaces of the wheel portions 122*a* and 132*a* are provided, respectively. In the left wheel 122 and the right wheel 132, parts of the wheel portions 122*a* and 132*a* are inserted into long rectangular wheel recess portions 124 and 134 provided on the lower surfaces of the left opening and closing member 120 and the right opening and closing member 130, and the wheel portions 122*b* and 132*b* rotatably engage with shaft support protrusion portions 123 and 133 provided on both sides of the wheel recess portions 124 and 134. In a state (state of FIGS. 1, 2, and 4) where the opening and closing member 150 (the left opening and closing member 120 and the right opening and closing member 130) is closed, the left wheel 122 and the right wheel 132 are rotatably provided such that a rotating shaft direction is the horizontal direction.

The second member 200 is a structure that is formed to imitate a cheese interposed in the burger. As illustrated in FIG. 3, the second member 200 includes an edge portion 202 that slightly hangs down from an edge of a substantially circular upper surface plate 201, and a plurality of regulation members 210 that extend slightly downward from the edge portion 202 are provided. The edge portion 202 and the regulation members 210 exhibit a form where the cheese hangs down. In the present embodiment, four regulation members 210 are provided in the second member 200. An engagement hole portion 220 as a substantially circular through hole is provided at a substantially center of the upper surface plate 201 of the second member 200.

The edge portion 202 is formed to be slightly larger than the outer periphery of the first member 100 in the state where the opening and closing member 150 (the left opening and closing member 120 and the right opening and closing member 130) is closed. Accordingly, the second member 200 can cover the first member 100 from the upper side of the first member 100. Accordingly, the second member 200 is attachable to and detachable from the first member 100 in the vertical direction (in other words, in the rotating shaft direction of the hinge portion 160). In the state (state of FIGS. 1 and 2) where the second member 200 is attached to and covers the first member 100, the edge portion 202 is disposed in an outer periphery of an upper edge portion of the first member 100, and the four regulation members 210 are disposed on an outer peripheral surface of the first member 100.

Figure 10:
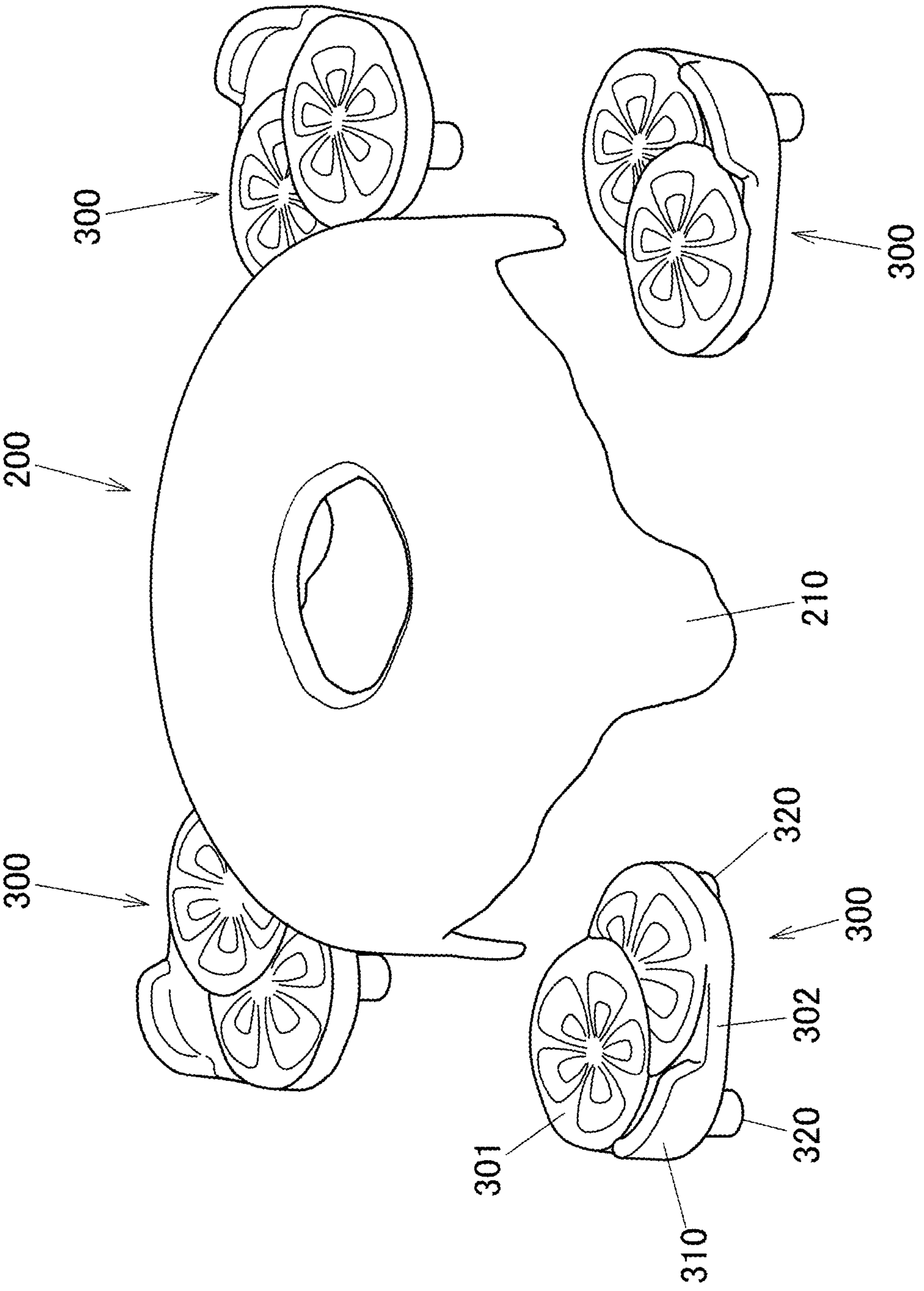
FIG. 10 is a perspective view illustrating a state where, when the transformable store toy as the transformable toy for figure play according to the embodiment of the present disclosure is transformed and played as a store, the detached second member and the detached third member are used as a table toy and a chair toy.

The third member 300 is a structure in a form imitating a tomato slice. Four third members 300 are provided in the present embodiment. The third members 300 includes a seat portion 301 having a substantially heart shape. A tomato slice-shaped pattern is formed on the seat portion 301. On an outer periphery of the seat portion 301, an edge wall portion 302 having an annular wall shape is formed. As illustrated in FIG. 10, on the seat portion 301 opposite to the edge wall portion 302, an engaging projection portion 310 that protrudes from the seat portion 301 is provided along an edge portion of a tip portion of the seat portion 301 having a substantially heart shape. An outer peripheral surface of the engaging projection portion 310 is continuous to an outer peripheral surface of the edge wall portion 302.

In the third member 300, three cylindrical support projection portions 320 that stand from the seat portion 301 are provided to protrude to a side opposite to the engaging projection portion 310. As illustrated in FIG. 3, among the three support projection portions 320, one support projection portion 320 is disposed on a tip side of the seat portion 301 having a substantially heart shape, and the other support projection portions 320 are disposed on swelling portion sides of the substantially heart shape.

The fourth member 400 is a structure that imitates the upper bun of the burger and is formed in a substantially flat hemispherical shape. In the fourth member 400, an annular portion 401 imitating a lettuce is formed in an annular shape from a lower end edge toward the outside. In a center portion of the fourth member 400, a slide flag portion 410 imitating a stick with a flag for fixing the burger is provided.

Figure 4:
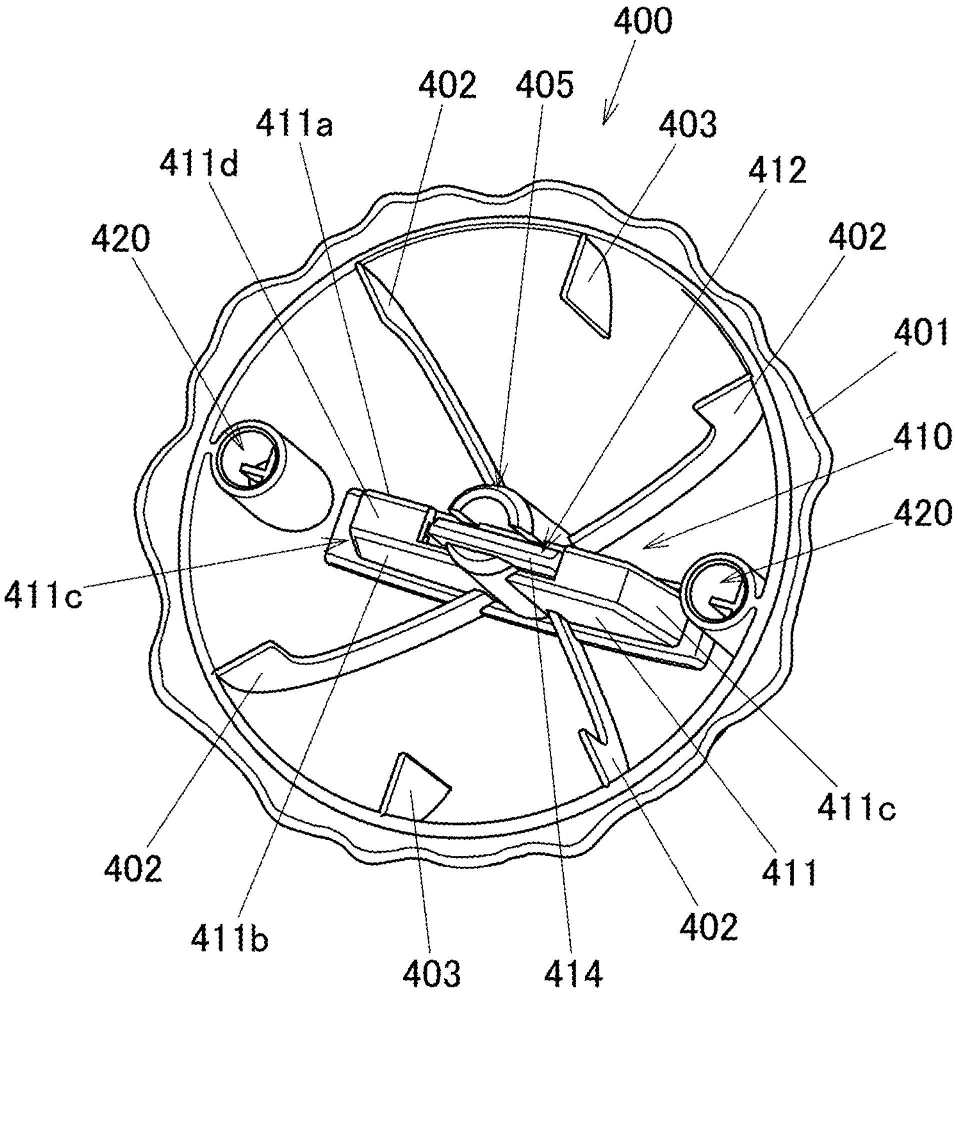
FIG. 4 is a perspective view illustrating a fourth member of the transformable store toy as the transformable toy for figure play according to the embodiment of the present disclosure when seen from the bottom.

As illustrated in FIG. 4, the fourth member 400 is formed to be hollow inside. In an inner center portion of the fourth member 400, a substantially cylindrical post portion 405 that is formed to be divided into a front side and a rear side is provided. In the fourth member 400, a slide case 411 that is disposed to overlap the post portion 405 and is formed in a flat rectangular shape is provided. In the slide case 411, a plate-like slide member 412 is provided to be slidable in the vertical direction.

Figure 5:
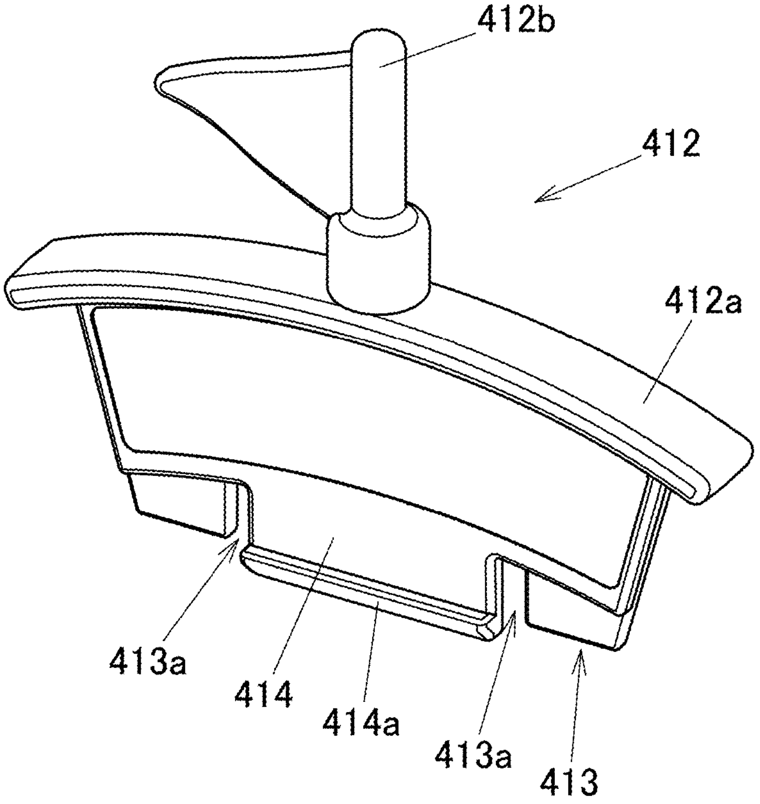
FIG. 5 is a perspective view illustrating a slide member of the fourth member of the transformable store toy as the transformable toy for figure play according to the embodiment of the present disclosure.

As illustrated in FIG. 5, an upper surface plate 412*a* is provided in the slide member 412. The upper surface plate 412*a* is formed in a convex curved shape and a plate shape with a narrow width. As illustrated in FIG. 3, when the slide member 412 is retracted, an upper surface of the upper surface plate 412*a* is provided to be substantially continuous to an outer surface of the fourth member 400. Referring back to FIG. 5, a stick portion 412*b* with a flag is provided from a substantially center portion of the upper surface plate 412*a* upwards. On a lower surface of the upper surface plate 412*a*, a plate-like slide plate portion 413 is provided. The slide plate portion 413 is formed in a substantially reverse trapezoidal shape. In the slide plate portion 413, notches 413*a* are provided at two positions, and a plate spring 414 including a sliding protrusion portion 414*a* is provided between the two notches 413*a*.

Figure 6:
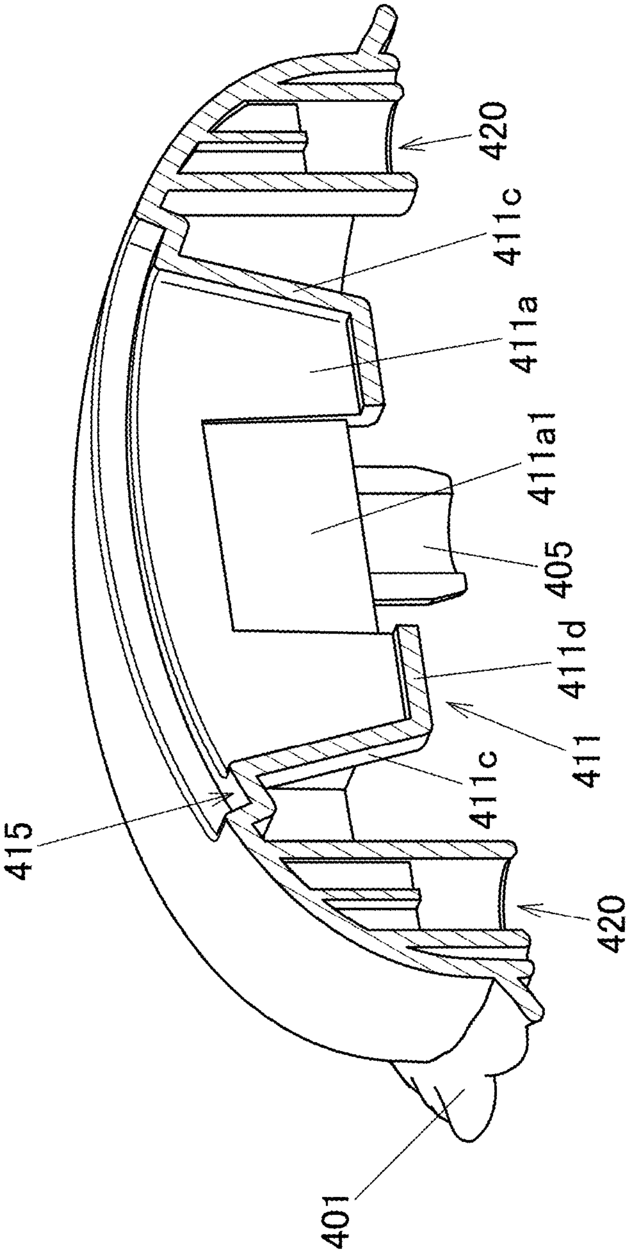
FIG. 6 is a cross-sectional perspective view taken along VI-VI of FIG. 3 illustrating a state where the slide member is removed in the fourth member of the transformable store toy as the transformable toy for figure play according to the embodiment of the present disclosure.

On the other hand, in the slide case 411, as illustrated in FIG. 4, a front side plate 411*a* having a substantially reverse trapezoidal shape and a rear side plate 411*b* also having a substantially reverse trapezoidal shape are provided. The front side plate 411*a* and the rear side plate 411*b* are connected through right and left side plates 411*c* and a bottom plate 411*d*. The front side plate 411*a* is connected to the divided front side of the post portion 405, and the rear side plate 411*b* is connected to the divided rear side of the post portion 405. Substantially center portions of the bottom plate 411*d* and the front side plate 411*a* are cut out in the horizontal direction. As illustrated in FIG. 6, on an upper side from the portion where the front side plate 411*a* is cut out, an inclined portion 411*a*1 that is formed in a substantially trapezoidal shape to be recessed from an inner surface of the front side plate 411*a* is provided. The inclined portion 411*a*1 is inclined to hang down toward the tip (also refer to FIG. 7).

Figure 7:
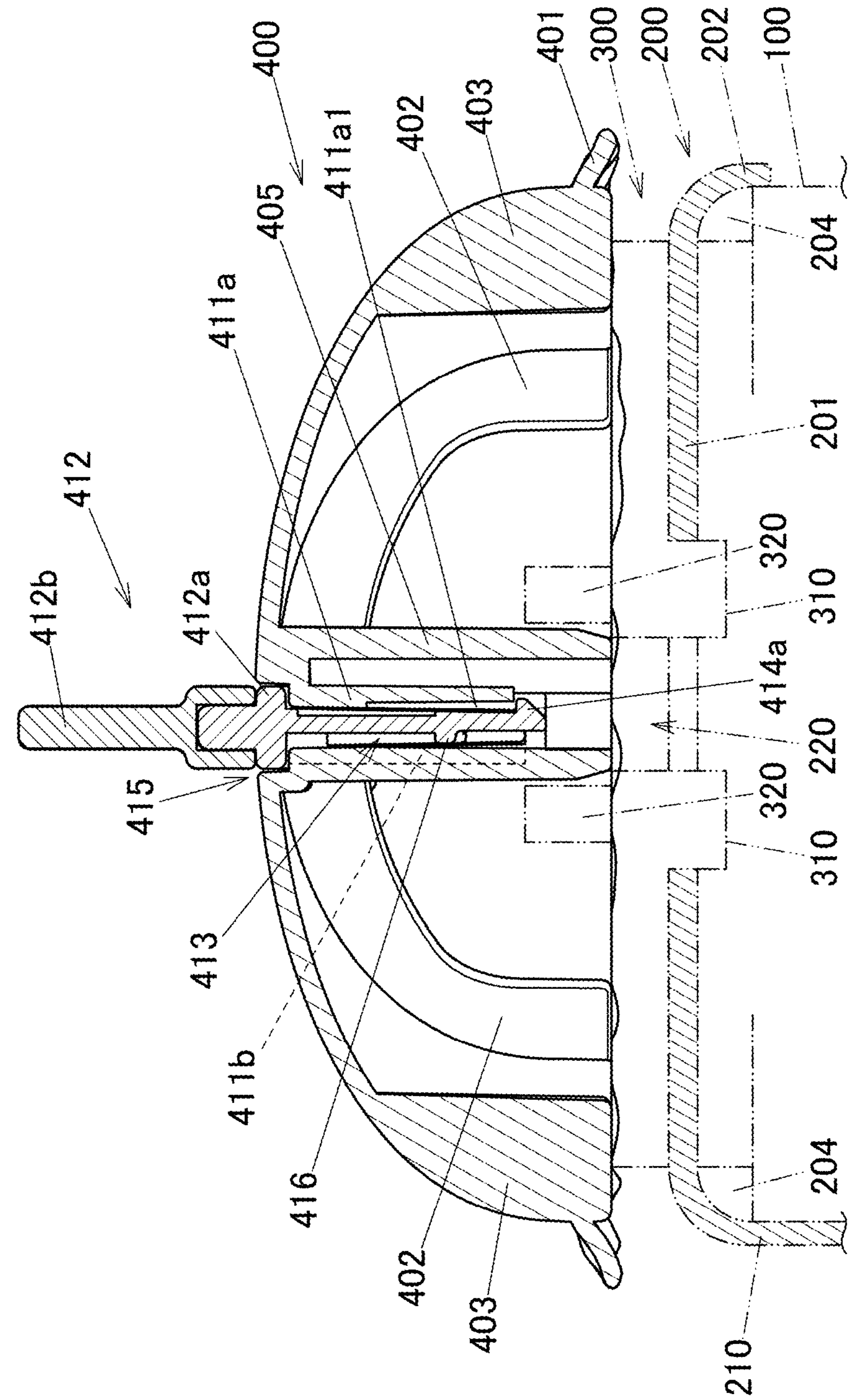
FIG. 7 is a cross-sectional view taken along VII-VII of FIG. 3 in the fourth member of the transformable store toy as the transformable toy for figure play according to the embodiment of the present disclosure, illustrating a state where a first member, a second member, and a third member are schematically indicated by a two-dot chain line and the transformable store toy is assembled.

Above the slide case 411, a storage portion 415 is formed to be recessed from the outer surface of the fourth member 400. As illustrated in FIG. 7, the slide member 412 is provided such that the slide plate portion 413 slides with the slide case 411. The slide member 412 is disposed such that a tip of the sliding protrusion portion 414*a* slides with the inclined portion 411*a*1 of the front side plate 411*a*. On a back side of the slide plate portion 413, an elongated protrusion 416 that is long in the horizontal direction is provided and slides with the rear side plate 411*b*. When the slide member 412 is moved upward, the plate spring 414 can be pressed rearward by the inclined portion 411*a*1 where the depth gradually decreases, and can be maintained at a position where the plate spring 414 is slid upward. When the slide member 412 is pressed down, the upper surface plate 412*a* of the slide member 412 is stored in the storage portion 415.

As illustrated in FIG. 4, on an inner surface of the fourth member 400, a rib 402 is provided in a substantially cross shape centering on the post portion 405 at a position rotated by about 45 degrees from the front-rear direction. The rib 402 is formed such that a portion in the vicinity of the edge portion of the fourth member 400 is wide. Two small ribs 403 are provided in front and rear edge portions of the inner surface of the fourth member 400. On each of the right and left sides of the slide case 411, a substantially cylindrical store post hole 420 is provided.

In an assembled state where the respective members of the transformable store toy 10 overlap each other as illustrated in FIGS. 1 and 2, when the regulation members 210 face the first member 100, the second member 200 is attached to and covers the first member 100 where the opening and closing member 150 is closed from above as the rotating shaft direction of the hinge portion 160. Here, even when the second member 200 is at any position in the rotating direction at the center of the upper surface plate 201, some regulation members 210 among the four regulation members 210 of the second member 200 are disposed corresponding to an outer peripheral surface of the main body member 110 of the first member 100, an outer peripheral surface of the left opening and closing member 120, and an outer peripheral surface of the right opening and closing member 130. Depending on the disposition of the second member 200, the regulation members 210 may be also disposed over the main body member 110 and the left opening and closing member 120 or the right opening and closing member 130. Accordingly, the opening and closing of the opening and closing member 150 is regulated by the plurality of regulation members 210 of the second member 200.

As illustrated in FIG. 7, when the second member 200 is disposed to overlap the first member 100, a plurality of ribs 204 that are provided over the upper surface plate 201 and the edge portion 202 of the second member 200 come into contact with an upper surface of the first member 100. An upper end of a substantially U-shaped edge portion provided in the tray portion 111*a* or an upper end of the outer periphery of the store post hole 114 (refer to FIG. 3) comes into contact with a lower surface of the upper surface plate 201. Accordingly, a predetermined space is ensured between the lower surface of the upper surface plate 201 and the upper surface of the first member 100.

The four third members 300 are disposed in a state where the engaging projection portion 310 of each of the third members 300 is inserted into one engagement hole portion 220 of the second member 200 and the plurality of third members 300 engage with the second member 200. Here, the four third members 300 are disposed in a substantially annular shape such that the tip of the seat portion 301 having a substantially heart shape faces the center side as illustrated in FIG. 3. The fourth member 400 is disposed above the third members 300.

As illustrated in FIG. 7, in a state where the fourth member 400 is disposed above the third members 300, the support projection portions 320 of the four third members 300 are disposed on the outer periphery of the post portion 405 of the fourth member 400. The wide portion of the rib 402 and the small ribs 403 in the fourth member 400 can be disposed on the edge wall portions 302 of the third members 300. The third members 300 engage with the second member 200, and the movement thereof is regulated by the post portion 405, the rib 402, and the small ribs 403. The movement of the fourth member 400 in the horizontal direction is regulated by disposing the support projection portions 320 around the post portion 405.

Figure 8:
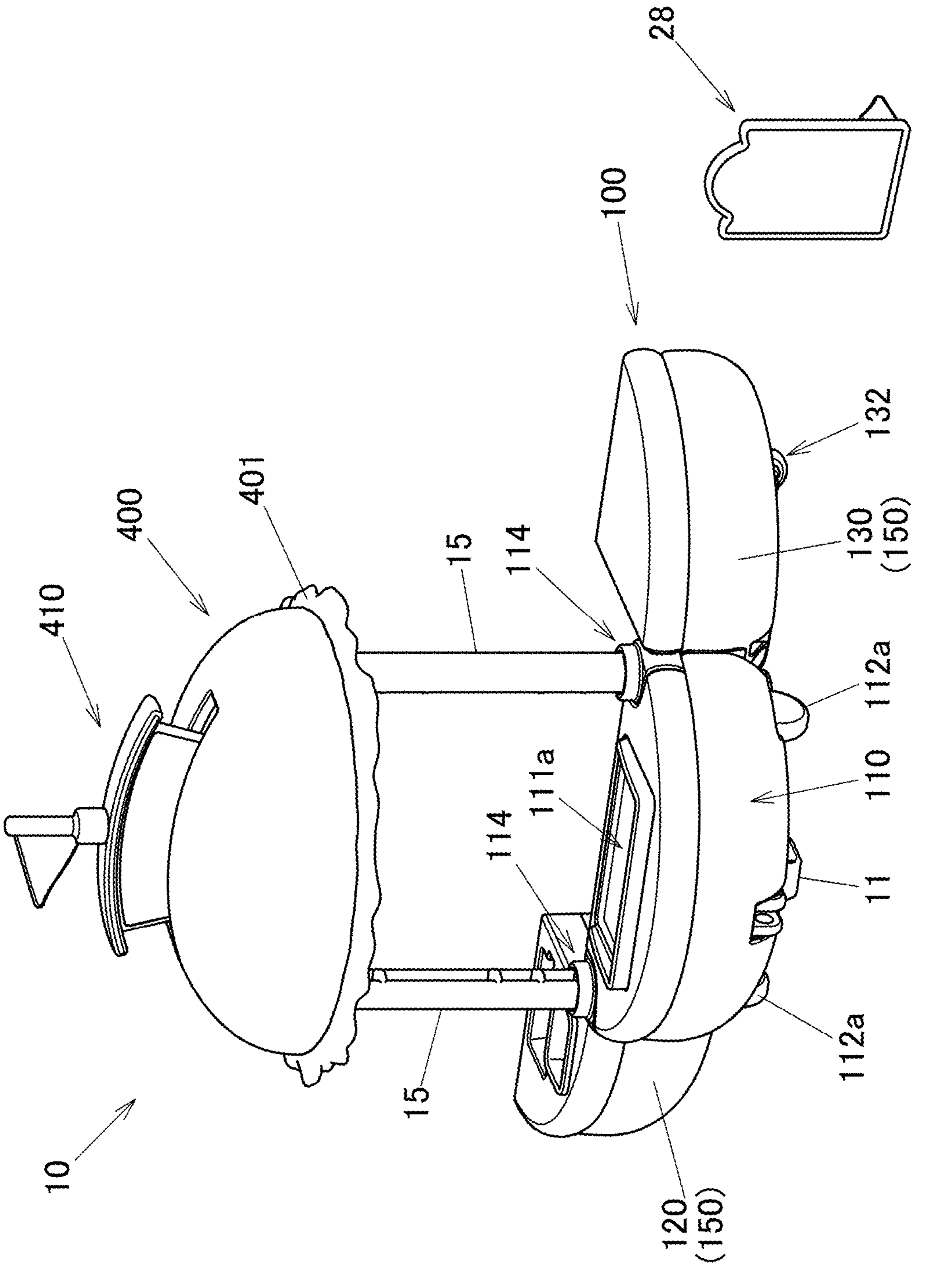
FIG. 8 is a perspective view illustrating a state where the transformable store toy as the transformable toy for figure play according to the embodiment of the present disclosure is transformed and played as a store when seen from the front.

By transforming the transformable store toy 10, the transformable store toy 10 can be played as a store that is a burger shop as illustrated in FIGS. 8 and 9. For the transformation of the transformable store toy 10, the fourth member 400, the third members 300, and the second member 200 are sequentially disassembled, the opening and closing member 150 of the first member 100 is opened by about 90 degrees, and the connected tool 11 is stored. Here, in the three-wheel bike toy 20 illustrated in FIG. 2, two store posts 15 imitating mufflers are provided on a lower surface. The store posts 15 are attachable to and detachable from the three-wheel bike toy 20 through a plate spring engaging portion 23 provided in the three-wheel bike toy 20. In the store post 15, one end can be inserted into the store post hole 114 of the first member 100, and another end can be inserted into the store post hole 420 of the fourth member 400. As a result, as illustrated in FIGS. 8 and 9, the first member 100 can be disposed as a store stand, and the fourth member 400 can be disposed as a roof in the store.

When the opening and closing member 150 is opened, a rotating shaft direction of the left wheel 122 and the right wheel 132 of the left opening and closing member 120 and the right opening and closing member 130 faces the front-rear direction. Therefore, the possibility that the opening and closing member 150 in the installation state is abruptly closed can be reduced. To further inhibit the opening and closing member 150 from being closed from the opened state, a ride-over protrusion can also be provided in the hinge portion 160 to regulate the movement of the opening and closing member 150 in the closing direction.

The second member 200 and the plurality of third members 300 can be played as a table toy and a chair toy as illustrated in FIG. 10. The second member 200 can be played as a table toy by disposing the regulation members 210 as legs of the table. The third member 300 can be played as a chair toy by disposing the support projection portions 320 as legs of the chair and disposing the engaging projection portion 310 as a backrest of the chair. A signboard 28 (refer to FIG. 2) that is stored such that a signboard surface faces upward is inserted into a lower portion of the box 25 of the three-wheel bike toy 20. When the transformable store toy 10 is played as the store of FIGS. 8 and 9, a user can take out and use the signboard 28 from the three-wheel bike toy 20.

The transformable store toy 10 and the three-wheel bike toy 20 as the transformable toy for figure play according to the present embodiment can be played in the form where the transformable store toy 10 as a towed vehicle imitating a form of a burger is towed by the three-wheel bike toy 20 as a towing vehicle that is driven by a figure. For example, in a play scene where a burger shop operates at a predetermined target location, the transformable store toy 10 can be transformed from the towed vehicle into a store as a burger shop and played. The second member 200 that can be recognized as a part of a burger from the outside in the state of the towed vehicle can be used as a table in the state of the store. As a result, the transformable store toy 10 can be enjoyably played in the play where a vehicle in the form of the burger is towed and the play of the burger shop that are consistent in terms of the burger.

With the above-described embodiment of the present disclosure, a transformable toy for figure play having the following aspects can be provided.

A transformable toy for figure play according to a first aspect includes: a first member including a main body member and an opening and closing member connected to the main body member through a hinge portion; and a second member including a plurality of regulation members configured to be disposed on an outer peripheral surface of the first member, the second member being provided to be attachable to and detachable from the first member in a rotating shaft direction of the hinge portion.

With such configuration, the opening and closing of the opening and closing member is regulated by the regulation members of the second member disposed on the outer peripheral surface of the first member. Therefore, while the first member is transformed by opening and closing the opening and closing member, both the first member and the second member can be recognized before and after the transformation, and the second member can also be used for play as a table or the like. Accordingly, a transformable toy for figure play where a play of transformation can also be enjoyed while recognizing the first member or the second member as a structure before and after transformation can be provided.

According to a second aspect of the transformable toy for figure play, the second member has an engagement hole portion that is engageable with an engaging projection portion provided in at least one a third member.

With such configuration, even when the third member is provided in addition to the first member and the second member, the third member can engage with the second member and be held in the assembled state before the transformation.

According to a third aspect, the transformable toy for figure play further includes a fourth member that includes a post portion, in which the at least one third member includes a plurality of the third members, each of the plurality of third members including a support projection portion that protrudes to a side opposite to the engaging projection portion, and the fourth member is formed such that the support projection portion of each of the plurality of third members is allowed to be disposed on an outer periphery of the post portion in a state in which the plurality of third members engage the second member.

With such configuration, the third members and the fourth member can engage with each other. Therefore, even when the fourth member is added, the fourth member can be held in the assembled state.

According to a fourth aspect, the transformable toy for figure play further includes a store post that is insertable into a store post hole provided in each of the main body portion of the first member and the fourth member.

With such configuration, the transformable toy for figure play can be played in a state where the toy is transformed into a store by inserting the store posts into the store post holes of the first member and the fourth member such that the first member is a store stand and the fourth member is a roof of the store.

According to a fifth aspect of the transformable toy for figure play, the opening and closing member includes a left opening and closing member including a left wheel and a right opening and closing member including a right wheel, and the hinge portion includes a left hinge portion that connects the left opening and closing member and the main body member and a right hinge portion that connects the right opening and closing member and the main body member.

With such configuration, even when the second member is detached and the left opening and closing member and the right opening and closing member as the opening and closing member are transformed to be opened, the left wheel and the right wheel can inhibit the left opening and closing member and the right opening and closing member from being closed.

Hereinabove, the embodiment of the present disclosure has been described. However, the present disclosure is not limited to the above-described embodiment, and various changes can be made within a range not departing from the scope of the present disclosure.

What is claimed is:

1. A transformable toy for figure play comprising:

a first member comprising a main body member and an opening and closing member connected to the main body member through a hinge portion; and a second member comprising a plurality of regulation members configured to be disposed on an outer peripheral surface of the first member, the second member being provided to be attachable to and detachable from the first member in a rotating shaft direction of the hinge portion.

2. The transformable toy for figure play according to claim 1, wherein the second member has an engagement hole portion that is engageable with an engaging projection portion provided in at least one third member.

3. The transformable toy for figure play according to claim 2, further comprising:

a fourth member comprising a post portion, wherein the at least one third member comprises a plurality of the third members, each of the plurality of third members comprising a support projection portion that protrudes to a side opposite to the engaging projection portion, and wherein the fourth member is formed such that the support projection portion of each of the plurality of third members is allowed to be disposed on an outer periphery of the post portion in a state in which the plurality of third members engage the second member.

4. The transformable toy for figure play according to claim 3, further comprising:

a store post that is insertable into a store post hole provided in each of the main body portion of the first member and the fourth member.

5. The transformable toy for figure play according to claim 1, wherein the opening and closing member comprises:

a left opening and closing member comprising a left wheel; and a right opening and closing member comprising a right wheel, and wherein the hinge portion comprises:

a left hinge portion that connects the left opening and closing member and the main body member; and a right hinge portion that connects the right opening and closing member and the main body member.

* * * * *